Dec. 24, 1935.  J. L. ANDERSON  2,025,081

MAGNETIC TEMPLATE FOLLOWER

Filed June 26, 1934

INVENTOR
James L. Anderson
BY
J. F. Brandenburg
ATTORNEY

Patented Dec. 24, 1935

2,025,081

UNITED STATES PATENT OFFICE 2,025,081

MAGNETIC TEMPLATE-FOLLOWER

James L. Anderson, Closter, N. J., assignor to Air Reduction Company, Incorporated, New York, N. Y., a corporation of New York Application June 26, 1934, Serial No. 732,478

13 Claims. (Cl. 33—23)

This invention relates to magnetic template-followers for moving a cutting or welding torch, or other instrumentality, in accordance with the outline of a template.

In the known types of magnetic template-followers the roller is rotated by a constant speed motor, and is magnetized, to cause it to adhere to the template, by a solenoid located immediately above or below the roller and in axial alinement with the roller. The template-follower is supported for universal movement in a plane and is connected with a torch-holder by connections which cause the torch to follow a path similar to that traveled by the template-follower.

As the motor rotates the roller at uniform speed, friction between the roller and template causes the roller to travel along the side surface of the template with uniform lineal speed and the torch is moved along a similar path at uniform speed.

In order to make smooth and accurate cuts it is necessary to maintain a uniform torch speed. Slipping of the roller on the template because of insufficient friction can not be tolerated. The roller of the template-follower is usually knurled so that it will not slip easily, but it is also necessary to maintain a strong magnetic attraction in order to insure sufficient friction.

Besides the risk of variation in torch speed, a follower with weak magnetic attraction between the roller and template is likely to be jarred away from the template, so that the torch swings out of the desired path and ruins the work.

Electromagnets using direct current are the only means with which the prior art has succeeded in obtaining sufficiently strong magnetic attraction to insure satisfactory operation of magnetic template-followers. In many locations alternating current is the only commercially available power and in such cases the provision of motor-generator sets or other sources of direct current has been an inconvenience and expense incident to the use of magnetic template-followers.

It is an object of this invention to provide an improved magnetic template-follower in which the magnetic flux from a plurality of magnets is concentrated in the roller to strongly magnetize the roller. This feature of the invention makes it possible to obtain a strong magnetic attraction between the roller and a template, even though the individual magnets are of much less strength than the electromagnets of the prior art. With this invention the necessary magnetism for the roller can be obtained from alternating current or permanent magnets.

Another object of the invention is to provide a magnetic template-follower which requires no electric power to magnetize the roller, but obtains a strong magnetism for the roller from one or more permanent magnets constructed and combined with the roller in a novel manner.

Other objects, features and advantages of the invention will appear or be pointed out as the specification proceeds.

In the accompanying drawing, forming part hereof:

Figure 1:
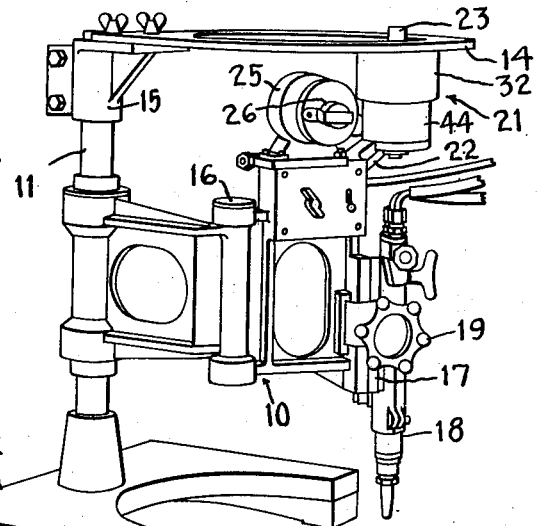
Fig. 1 is a perspective view of a universal cutting machine with a template-follower embodying the invention.

Magnetic template-followers are used on different types of universal cutting machines and the jointed arm machine shown in Fig. 1 is merely illustrative of a universal torch machine in which a magnetic template-follower moves a torch along a path similar to the outline of a template.

The universal cutting machine shown in Fig. 1 is of the type in which the template-follower is in vertical alinement with the torch. A jointed arm 10 is supported by a post 11 for swinging movement in a horizontal plane. The post 11 rises from a base 12. A template 14 is supported at the top of the post 11 by a clamp 15 on the post. A pivot connection 16 comprises the joint of the jointed arm.

A torch-holder 17 at the free end of the forward link of the jointed arm 10 supports a torch 18 which can be moved toward and from the work by a hand-wheel 19 operating rack and pinion mechanism which is well understood in the art.

A template-follower 21 is connected to the forward link of the jointed arm by a bracket 22 and is located in such position that the axis of the template-follower roller 23 is in line with the center of the cutting jet of the torch. The template-follower 21 is operated by a motor 25 which is of the governor-controlled type commonly used for template-followers, with a knob 26 for adjusting the governor to change the motor speed.

Figure 2:
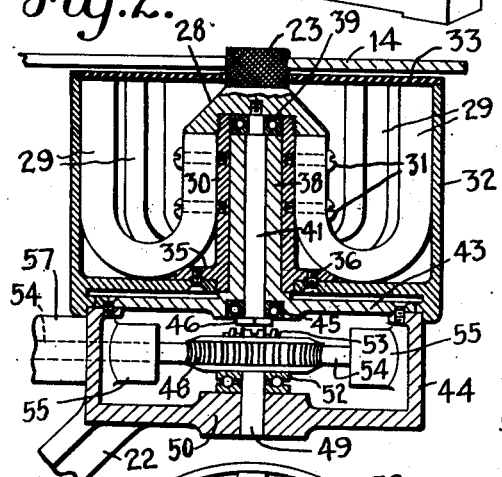
Fig. 2 is an enlarged vertical sectional view through the template-follower shown in Fig. 1.

Fig. 2 shows the roller 23 integral with a collector 28 which is of frustro-conical form and which contacts with the inner pole faces of a plurality of horseshoe magnets 29. The upper end of a hub or sleeve 30 threads into a central recess in the bottom face of the collector 28, and the magnets 29 are fastened to the sleeve 30 by screws 31. The sleeve 30 can be made with flat outside faces for contact with the sides of the magnets, but this is not necessary because the screws 31 hold the magnets in radial positions when clamping them against a cylindrical outside wall of the sleeve 30.

In the embodiment of the invention illustrated, the magnets 29 are permanent magnets and are enclosed by a casing 32 and a cover 33. This cover is preferably made of amyl acetate, or other non-magnetic material, and it has a central opening through which the roller 23 extends.

The outer poles of the magnets 29 are longer than the inner poles and extend close to the level of the template 14. There are a sufficient number of magnets 29 evenly spaced around the roller 23 so that two or more of the outer poles are always under the template when the follower is in operation. The magnetic circuit extends from the inner poles of the magnets 29 through the collector 28 which concentrates the flux from the magnets into the roller 23 from which it passes through the template and then across the short air gap between the template and the outer poles of the magnets 29 below the template.

There is a flange 35 near the lower end of the sleeve 30, and the casing 32 is connected with the sleeve by screws 36 extending through the bottom of the casing and threading into the flange 35. Thus, the roller 23, collector 28, magnets 29, sleeve 30, and casing 32 are connected together to rotate as a unit, and they are supported on a hollow post 38 as a bearing, with an anti-friction thrust bearing 39, at the upper end of the post, supporting the weight of the rotating structure.

A drive shaft 41 extends through the hollow post 38 and bearing 39, and threads into the collector 28. The hollow post 38 connects, at its lower end, with a cover plate 43 of a gear housing 44 carried at the outer end of the bracket 22. The lower end of the drive shaft 41 extends through a ball-bearing 45 which fits into a recess in the bottom face of the cover plate 43. A nut 46 is threaded on the lower end of the drive shaft and abuts against the inner race of the ball-bearing 45. This nut prevents the drive shaft from being lifted out of the hollow post and thus holds the rotating portion of the tracing device in assembled relation with the non-rotary portion.

A worm-wheel 48 is secured to a shaft 49 which turns in a central boss 50 as a bearing, and is operatively connected with the roller drive shaft 41 by a tongue and groove coupling. There is a ball-bearing thrust washer 52 between the worm-wheel 48 and the boss 50.

The worm-wheel 48 is driven by a worm 53 on a shaft 54 journaled in bearing lugs 55 on the inside wall of the gear housing. One end of the shaft 54 extends beyond the gear housing 44, and through a shaft housing 57 to the reduction gearing at the end of the armature shaft of the motor 25. Such reduction gear drives are well known on motors of the type used for template-followers and its illustration therefore unnecessary.

Figure 4:
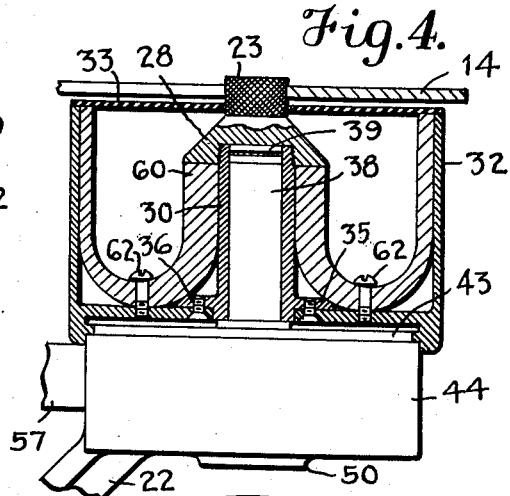
Figs. 4 and 5 are views corresponding to Figs. 2 and 3, but showing a modified form of the invention.
Figure 3:
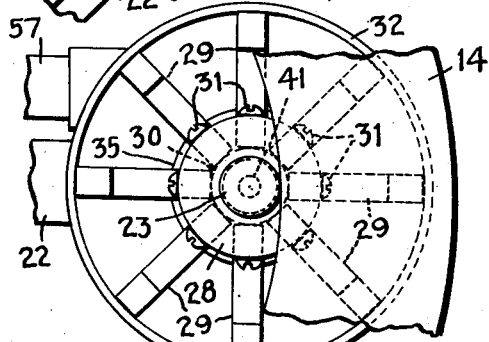
Fig. 3 is a top plan view of the template-follower shown in Fig. 2 with the cover removed.
Figure 5:
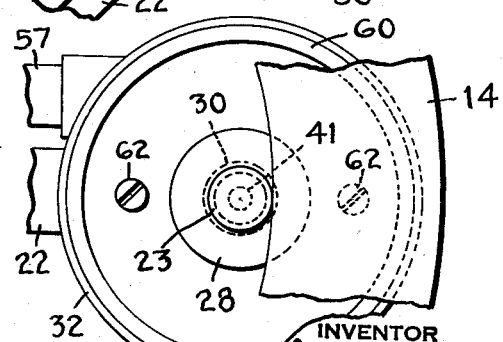

Figs. 4 and 5 show a modified form of the invention in which an annular permanent magnet 60, having a radial cross-section of horseshoe form, is employed in place of the ring of magnets 29. The radial thickness of the outer pole is preferably less than that of the inner pole so that the areas of the pole faces are substantially equal in spite of their differences in circumference.

In Fig. 4 the magnet 60 is fastened to the bottom of the casing 32 by screws 62 instead of being fastened to the sleeve 30 as in Fig. 2. This difference is necessary because the annular form of the magnet 60 makes it difficult to drill radial holes through the inner pole. The hollow shaft 38 and gear housing 44 are shown in elevation in Fig. 4, since the structure enclosed is identical with that illustrated in Fig. 2.

Although the template-follower of this invention has been described with particular reference to the moving of a cutting torch, it will be understood that the invention can be used for operating various devices which it is desirable to move in accordance with the outline of a template. It will be apparent that this template-follower is not limited to the particular embodiments which have been illustrated and described and that features of the invention may be used without others.

I claim:

1. A follower for template-controlled apparatus including a roller for contact with the template, and means for magnetizing the roller to cause it to adhere to the template including at least one magnet and a tapered flux collector over one pole face of the magnet and in position to concentrate in the roller the flux from said pole face.

2. A follower for template-controlled apparatus including a roller for contact with the template, and means for magnetizing the roller to cause it to adhere to the template including a plurality of magnets at spaced points around the roller, a collector in the magnetic circuit with the roller, said collector extending close to the corresponding pole faces of the magnets and decreasing in size toward the roller so that it serves to concentrate the magnetic flux in said roller.

3. A magnetic template-follower comprising a roller for contact with the template, a truncated-conical collector immediately below the roller and coaxial with said roller, driving mechanism including a shaft extending down from the roller and collector, an annular, horseshoe-type magnet surrounding the shaft, and having one of its annular pole faces immediately below the collector so that the collector concentrates the flux from that pole face in the roller.

4. A magnetic template-follower comprising a roller, means for magnetizing the roller including one or more magnets with corresponding pole faces in position to magnetize the roller, and having one or more pole faces in a plane higher than the first-mentioned pole faces for completing a magnetic circuit through the template when the roller is in contact with a template, a collector for concentrating the magnetic flux in said roller to cause the roller to adhere strongly to the template, and mechanism for rotating the roller to cause it to travel along the edge of the template.

5. In a template-follower of the type having a roller which travels along the edge of a template and is held in contact with the template by magnetic attraction, a hub, a plurality of magnets held against the hub and located around the hub with their corresponding pole faces close to the roller so that their combined magnetism is available to magnetize the roller.

6. In template-follower apparatus of the type having a roller which travels along the edge of a template and is held in contact with the template by magnetic attraction, a number of corresponding magnet poles around the roller, and means supporting said magnet poles close to the roller so that the roller receives flux from all of said magnet poles.

7. A template-follower comprising a roller, a plurality of horseshoe-type magnets located around the roller and having poles of different lengths, the short pole of each magnet being in position to magnetize the roller and cause it to adhere to a template, the longer poles of the magnets terminating in a plane which is close to the template when the roller is in contact with a template, and driving mechanism for rotating the roller to cause it to travel along the template.

8. In template-controlled apparatus, the combination of a roller, a plurality of corresponding magnet poles around the roller, means supporting the magnet poles in such positions that they all combine to magnetize the roller, and driving mechanism connected with the roller and the pole supporting means for rotating the roller and magnet poles as a unit.

9. A template-follower comprising a roller and a plurality of magnets with a collector in position to concentrate flux from all of the magnets in the roller, means connecting the roller, magnets, and collector so that they turn as a unit, and driving mechanism for rotating the roller, magnets, and collector.

10. In a template-follower of the type having a roller which travels along the edge of a template and is held in contact with the template by magnetic attraction, means for rotating the roller including a drive shaft, an annular magnet, of channel cross-section, surrounding the drive shaft with the inner pole face of said annular magnet in position to magnetize the roller, and the outer pole face in position to extend under the template when any point on the circumference of the roller is in contact with the template.

11. Apparatus of the character described including a roller for contact with a template, mechanism for rotating the roller to cause it to travel along the template, an annular magnet around the roller with the inner pole face in position to magnetize the roller, and means connecting said annular magnet with said mechanism so that the roller and magnet rotate as a unit.

12. A template-follower comprising a roller, mechanism for rotating the roller including a drive shaft coaxial with said roller, an annular magnet of channel cross-section along its radius, the inner pole face of the magnet being of substantially larger extent than a section through the roller parallel to said face, and a collector between the roller and magnet, extending over said inner pole face of the magnet and tapering toward said roller to provide a magnetic circuit between the magnet and roller, and to concentrate in the roller the flux from said pole face.

13. A magnetic template-follower comprising a power-driven roller for contact with a template, and magnetic means for holding the roller against the template including a plurality of magnets and a collector in position to concentrate the flux from said magnets and produce a field intensity, adjacent the edge of the template, greater than that of the individual magnets.

JAMES L. ANDERSON.